United States Patent
Bayerer et al.

(10) Patent No.: US 10,374,439 B2
(45) Date of Patent: Aug. 6, 2019

(54) CIRCUIT ARRANGEMENT HAVING CHARGE STORAGE UNITS

(71) Applicant: Infineon Technologies AG, Neubiberg (DE)

(72) Inventors: Reinhold Bayerer, Reichelsheim (DE); Johannes Teigelkoetter, Aschaffenburg (DE)

(73) Assignee: Infineon Technologies AG, Neubiberg (DE)

( * ) Notice: Subject to any disclaimer, the term of this patent is extended or adjusted under 35 U.S.C. 154(b) by 498 days.

(21) Appl. No.: 15/005,432

(22) Filed: Jan. 25, 2016

(65) Prior Publication Data

US 2016/0218524 A1    Jul. 28, 2016

(30) Foreign Application Priority Data

Jan. 26, 2015   (DE) .......................... 10 2015 101 087

(51) Int. Cl.
   *H02J 7/00*   (2006.01)
   *H02J 7/34*   (2006.01)
   (Continued)

(52) U.S. Cl.
   CPC .......... *H02J 7/0013* (2013.01); *H02J 7/0072* (2013.01); *H02M 7/003* (2013.01); *H02J 7/345* (2013.01);
   (Continued)

(58) Field of Classification Search
   USPC ............ 363/17, 132, 124, 21.12, 55, 71, 84; 320/103, 107, 108, 119, 133, 17, 132,
   (Continued)

(56) References Cited

U.S. PATENT DOCUMENTS 5,602,726 A * 2/1997 Sakai ...................... H02J 9/061
                                                      363/21.12
5,659,237 A * 8/1997 Divan .................. H02J 7/0018
                                                      320/119

(Continued)

FOREIGN PATENT DOCUMENTS

CN           1225757 A     8/1999

*Primary Examiner* — Alexis B Pacheco
(74) *Attorney, Agent, or Firm* — Murphy, Bilak & Homiller, PLLC

(57) ABSTRACT

A circuit arrangement includes a power semiconductor circuit, a first charge storage unit and a second charge storage unit. The first charge storage unit has first and second terminals, the second charge storage unit has first and second terminals, and the power semiconductor circuit has first and second terminals. The power semiconductor circuit also has a first semiconductor component and a second semiconductor component, the load paths of which are electrically connected in series between the first and second terminals of the power semiconductor circuit. A first connection electrically connects the first terminal of the first charge storage unit to the first terminal of the second charge storage unit, and a second connection electrically connects the second terminal of the first charge storage unit to the second terminal of the second charge storage unit. A magnetic core is electromagnetically coupled to the first and/or second connections.

20 Claims, 9 Drawing Sheets

(51) Int. Cl.
*H02M 1/32* (2007.01)
*H02M 7/00* (2006.01)
*H02M 7/06* (2006.01)
*H02M 5/458* (2006.01)
*H02M 7/5387* (2007.01)

(52) U.S. Cl.
CPC .............. *H02M 5/458* (2013.01); *H02M 7/06* (2013.01); *H02M 7/5387* (2013.01); *H02M 2001/327* (2013.01)

(58) Field of Classification Search
USPC ........................... 320/124, 21.12, 55, 71, 84
See application file for complete search history.

(56) References Cited

U.S. PATENT DOCUMENTS

| | | | | |
|---|---|---|---|---|
| 5,982,645 A * | 11/1999 | Levran | ................ | H01F 27/2866 307/66 |
| 6,088,250 A * | 7/2000 | Siri | ........................ | H02J 1/102 320/133 |
| 7,525,283 B2 * | 4/2009 | Cheng | ........................ | H01F 3/02 320/108 |
| 9,030,843 B1 * | 5/2015 | Herbert | ............. | H02M 3/33561 363/17 |
| 9,789,777 B2 * | 10/2017 | Mi | ........................ | B60L 11/182 |
| 2005/0018452 A1 * | 1/2005 | Seo | ........................ | H01F 38/14 363/16 |
| 2007/0222426 A1 * | 9/2007 | Waffenschmidt | ....... | H01F 38/14 323/355 |
| 2010/0033156 A1 * | 2/2010 | Abe | ........................ | H02J 5/005 323/305 |
| 2013/0188397 A1 * | 7/2013 | Wu | ................... | H02M 3/33576 363/17 |
| 2013/0320759 A1 * | 12/2013 | Abe | ........................ | H01F 38/14 307/10.1 |
| 2014/0203772 A1 * | 7/2014 | Yeo | ........................ | H03F 3/2171 320/108 |
| 2015/0015197 A1 * | 1/2015 | Mi | ........................ | B60L 11/182 320/108 |
| 2015/0035459 A1 * | 2/2015 | Yang | ................... | B60L 11/1816 318/139 |
| 2015/0138841 A1 * | 5/2015 | Pahlevaninezhad | .... | H02J 3/383 363/17 |

* cited by examiner

CIRCUIT ARRANGEMENT HAVING CHARGE STORAGE UNITS

PRIORITY CLAIM

This application claims priority to German Patent Application No. 10 2015 101 087.9 filed on 26 Jan. 2015, the content of said application incorporated herein by reference in its entirety.

TECHNICAL FIELD

The present invention relates to a circuit arrangement comprising a charge storage unit which is a device that can be electrically charged such as capacitors, capacitor banks, batteries, battery banks, etc.

BACKGROUND

Charge storage units such as capacitors, capacitor banks, batteries, battery banks, etc. for example in conjunction with high-power power converters/converter assemblies, inverter/inverter assemblies can be used as energy storage units. Such charge storage units heat up frequently during operation, as a result of which their lifetime is shortened.

SUMMARY

One aspect of the invention relates to a circuit arrangement comprising a power semiconductor circuit, a first charge storage unit, a second charge storage unit, a first connection and a second connection. The term 'charge storage unit' as used herein refers to a device that can be electrically charged such as capacitors, capacitor banks, batteries, battery banks, etc. The connections can be realized by a wire or conductor, bars, plates, or other similar types of connections, which can include parallel arrangements of such connection types. The power semiconductor circuit has a first terminal and a second terminal, and also a first semiconductor component and a second semiconductor component, the load paths of which are electrically connected in series between the first terminal and the second terminal of the power semiconductor circuit. Moreover, the first charge storage unit and the second charge storage unit also have in each case a first terminal and in each case a second terminal connection. The first connection electrically connects the first terminal of the first charge storage unit to the first terminal of the second charge storage unit, and the second connection electrically connects the second terminal of the first charge storage unit to the second terminal of the second charge storage unit. A magnetic core is electromagnetically coupled to the first connection.

Those skilled in the art will recognize additional features and advantages upon reading the following detailed description and on viewing the accompanying drawings.

BRIEF DESCRIPTION OF THE DRAWINGS

The accompanying drawings are included to provide a further understanding of embodiments and are incorporated in and constitute a part of the description. The drawings illustrate examples and together with the description serve to explain principles of embodiments. Other embodiments and many of the intended advantages of embodiments will be readily appreciated as they become better understood by reference to the following detailed description.

DETAILED DESCRIPTION

Figure 1:
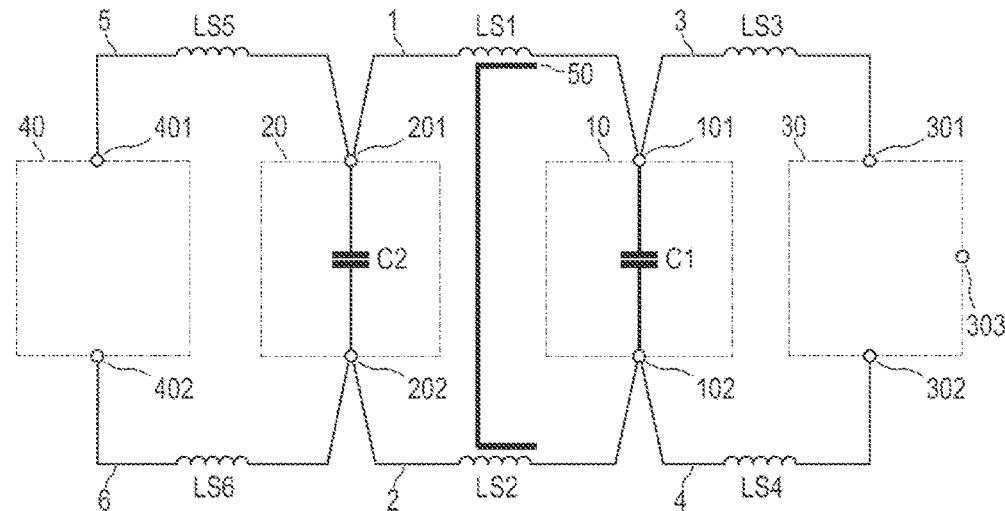
FIG. 1 shows a circuit diagram of a circuit arrangement in accordance with a first example.

FIG. 1 shows a circuit diagram of a circuit arrangement. The circuit arrangement comprises a first charge storage unit 10 embodied as a capacitor unit and having a first terminal 101 and a second terminal 102. The total capacitance of the first capacitor unit 10 is designated by C1. Accordingly, the first capacitor unit 10 forms or contains a capacitor having terminals 101 and 102 and also a capacitance C1. A first capacitor unit 10 can be, for example, part of an intermediate circuit capacitor.

Furthermore, the circuit arrangement comprises a second charge storage unit 20 having a first terminal 201 and a second terminal 202. The second charge storage unit 20 can be embodied as a (second) capacitor unit, as is shown merely by way of example in FIG. 1. The total capacitance of said unit is designated by C2. Accordingly, a second capacitor unit 20 forms or contains a capacitor having terminals 201 and 202 and also a capacitance C2. A second capacitor unit 20 can be, for example, an intermediate circuit capacitor. The term 'charge storage unit' as used herein refers to a device that can be electrically charged such as capacitors, capacitor banks, batteries, battery banks, etc.

A first connection 1 electrically connects the first terminal 101 of the first capacitor unit 10 to the first terminal 201 of the second charge storage unit 20, and a second connection 2 electrically connects the second terminal 102 of the first capacitor unit 10 to the second terminal 202 of the second charge storage unit 20. The connections can be realized by a wire or conductor, bars, plates, or other similar types of connections, which can include parallel arrangements of such connection types.

As is furthermore shown in FIG. 1, the circuit arrangement can comprise a power semiconductor circuit 30 and/or a power semiconductor circuit 40. If a power semiconductor circuit 30 is present, it has a first terminal 301, which is electrically connected to the first terminal 101 of the first capacitor unit 10 by means of a third connection 3, and also a second terminal 302, which is electrically connected to the second terminal 102 of the first capacitor unit 10 by means of a fourth connection 4.

If a power semiconductor circuit 40 is present, it has a first terminal 401, which is electrically connected to the first terminal 201 of the second charge storage unit 20 by means of a fifth connection 5, and also a second terminal 402, which is electrically connected to the second terminal 202 of the second charge storage unit 20 by means of a sixth connection 6.

Insofar as connections 1, 2, 3, 4, 5, 6 are present, they have leakage inductances LS1, LS2, LS3, LS4, LS5 and LS6, respectively.

A power semiconductor circuit 30 (or 40) can be, for example, an arbitrary power converter circuit, converter assembly circuit or other power electronic circuit (e.g. a rectifier circuit or an inverter circuit), a half-bridge circuit having one, two, three or more than three half-bridges. At any rate a power semiconductor circuit 30 and/or 40 uses capacitors as energy stores. Generally, a power semiconductor circuit 30 (and/or 40) contains at least two semiconductor components, the load paths of which are electrically connected in series between the first terminal 301 (and/or 401) and the second terminal 302 (and/or 402). Examples of possible configurations of power semiconductor circuits will be explained in even greater detail later.

Apart from that, a power semiconductor circuit 40 can also be embodied as a voltage source which, between the first terminal 401 and the second terminal 402, provides a substantially constant DC voltage or a non-constant voltage having a DC voltage offset.

An electrical voltage output by a power semiconductor circuit 40 between the terminals 401 and 402 can be used e.g. to electrically charge the first and second charge storage units 10 and 20. The charged charge storage units 10 and 20 can then be used as an energy source for feeding a circuit arrangement 30 that outputs a variable output voltage and/or a variable or else arbitrarily shaped current. The variation of the output voltage and the shaping of the current can be effected for example by pulse width modulation of the switching times of power semiconductors. For this purpose, an electrical potential can be provided at an output 303 of the circuit arrangement 30. In this case, the charged charge storage units 10 and 20 can be at least partly discharged again. The (partial) charging and (partial) discharging of the charge storage units 10 and 20 can be effected for example continuously in alternation.

By connecting an electrical potential to the output 303, it is possible for an arbitrary load connected to the output, for example also an inductive load such as e.g. an electric motor, to be supplied with electrical energy. In the case of an electric motor, e.g. the rotational speed thereof can also be controlled by open-loop or closed-loop control.

If a hard switch-off of high currents or generally current commutations occur during the operation of the circuit arrangement 30, high induced voltage spikes can occur on account of unavoidable leakage inductances. Said switch-off or commutations bring about a switch-off of the current or of a partial current at least in one of the third or fourth connections 3 or 4, respectively. In the extreme case, said induced voltage spikes can destroy the circuit arrangement 30 and/or components connected thereto. The first capacitor arrangement 10 can now be used to reduce such induced voltage spikes. For this purpose, it is advantageous if the third connection 3 and the fourth connection 4 are designed with very low inductance, i.e. their leakage inductances LS3 and LS4, respectively, are very low. This can be achieved, for example, by said connections being embodied as planar metal strips led parallel at a small distance with respect to one another, or by a multiplicity of conductor pairs (which can run e.g. in each case in pairs parallel or coaxially) being used, wherein in each conductor pair respectively a first of the pair constitutes a part of the third connection 3 and a second of the pair constitutes a second of the conductors (the first of the conductors of all pairs are then electrically connected in parallel, and their parallel connection can then form the third connection 3. Correspondingly, the second of the conductors of all pairs are then electrically connected in parallel, and their parallel connection can then form the fourth connection 4). Optionally, between such metal strips or generally between the conductors of the same pair, in each case an electrically insulating solid layer can be arranged in order to electrically insulate the metal strips from one another.

Circuit arrangements 30 can be embodied in the form of a semiconductor module, for example. In such configurations, the first capacitor arrangement 10 can optionally also be part of the semiconductor module, as a result of which the third connection 3 and the fourth connection 4 can be optimized in the module and thus be embodied with particularly low inductance.

The first capacitor arrangement 10 serves primarily to reduce induced voltage spikes. By contrast, the purpose of the second charge storage unit 20 primarily consists in storing electrical energy. In order that the second charge storage unit 20 can provide a sufficient amount of energy at least in specific switching phases of the circuit arrangement 30, it must have a sufficient storage capacitance. Therefore, it may be advantageous if the charge storage capacity of the second charge storage unit 20 is significantly greater than the charge storage capacity of the first charge storage unit 10. In the case of charge storage units 10 and 20 embodied as capacitor arrangements, the capacitance C2 of the second capacitor arrangement 20 can be e.g. at least ten times the capacitance C1 of the first capacitor arrangement 10. In principle, however, the capacitance C2 can also be less than or equal to ten times the capacitance C1.

However, the second charge storage unit C2 need not necessarily be embodied as a capacitor unit. By way of example, it can also be embodied as a rechargeable battery that is charged via either a power semiconductor circuit 40 embodied as a rectifier circuit or a charger.

In any case the first charge storage unit 10 and the second charge storage unit 20 constitute parts of a resonant circuit which, depending on the switch-on and switch-off behavior of the (if present) circuit arrangements 30 and/or 40, can exhibit a more or less greatly pronounced oscillation behavior in which currents whose current flow direction changes with the rhythm of the oscillation respectively flow through the first connection 1 and the second connection 2. In this case, both the first charge storage unit 10 and the second charge storage unit 20 are multiply charged and discharged with the rhythm of the oscillation, which leads to an—as explained initially—undesired additional heating of both the first charge storage unit 10 and the second charge storage unit 20. This effect is relevant in particular also when switching on and switching off high currents through one or a plurality of the connections 1, 2, 3, 4, 5 and 6, since a high current through the relevant connection 1, 2, 3, 4, 5 and/or 6, on account of the leakage inductance LS1, LS2, LS3, LS4, LS5 and/or LS6 thereof, respectively, generates a magnetic field in which energy is stored. If, by way of example, the intensity of the relevant current is rapidly reduced, as is the case e.g. during the hard switch-off, then in the LC circuits (e.g. C1, C2, LS2, LS1) present there arise oscillations that are damped by parasitic electrical resistances in the capacitors and e.g. in connections 1, 2. The parasitic resistances of the capacitor arrangements are normally predominant. At the end of the oscillation, the energy that was stored in the inductances directly before the switch-off is converted into losses (heat) in the parasitic resistances. This leads to the explained heating of both the first capacitor arrangement 10 and the second capacitor arrangement or charge storage unit 20.

The present invention shifts the location at which there arises a large part of the additional heat, which would normally arise in the first capacitor arrangement 10 and the charge storage unit 20, to a different location remote from the capacitor arrangement 10 and the charge storage unit 20. For this purpose, a magnetic core 50 is used, which is electromagnetically coupled to the first connection 1 and/or the second connection 2. Upon incipient oscillation behavior, this coupling results in a great change in the current through the first connection 1 and/or the second connection 2 and, in association therewith, in hysteresis losses in the magnetic core 50, such that a large part of the energy stored in the magnetic field generated by the current through the first connection 1 is consumed in the magnetic core 50. The magnetic core 50 therefore brings about a damping of the oscillation behavior if the current through the first connection 1 changes greatly. If the current through the first connection 1 and/or the second connection 2 otherwise does not change or changes only slightly, the current through the first connection 1 and/or the second connection 2 is counteracted substantially only by the electrical (ohmic) resistance of the first connection 1, of the second connection 2 and also of the first capacitor unit 10 and of the charge storage unit 20. The magnetic core 50 therefore has a damping effect on the oscillations that lead to the undesired additional heating of the first capacitor arrangement 10 and of the charge storage unit 20. The intensity of this damping can be set by the material and the construction of the magnetic core 50. This damping increases with the intensity of the hysteresis losses exhibited by the material of the magnetic core 50. Moreover, the damping is all the greater, the more the eddy currents permitted by the magnetic core 50. A magnetic core composed of a multiplicity of parallel laminations electrically insulated from one another brings about, for example, a lower damping than a magnetic core 50 of the same size which does not comprise laminations but rather consists uniformly of the same material as the laminations.

As can be gathered from FIG. 1, the magnetic core 50 can be coupled both to the first connection 1 and to the second connection 2. In a departure therefrom, however, the magnetic core 50 could also be coupled to the first connection 1 but not to the second connection 2, or conversely to the second connection 2 but not to the first connection 1.

Figure 2:
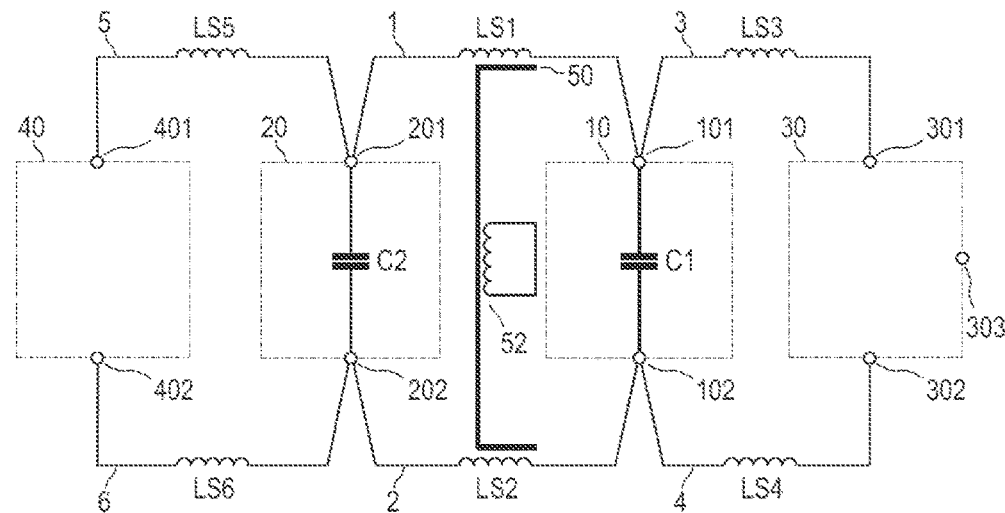
FIG. 2 shows a circuit diagram of a circuit arrangement in accordance with a second example.

As is furthermore shown on the basis of the circuit diagram in accordance with FIG. 2, in the case of an arrangement such as was explained with reference to FIG. 1, the magnetic core 50 can optionally be provided with a winding 52 that is part of a closed current loop. In this sense, a self-contained winding 52 should likewise be regarded as "part of a closed current loop".

Figure 3:
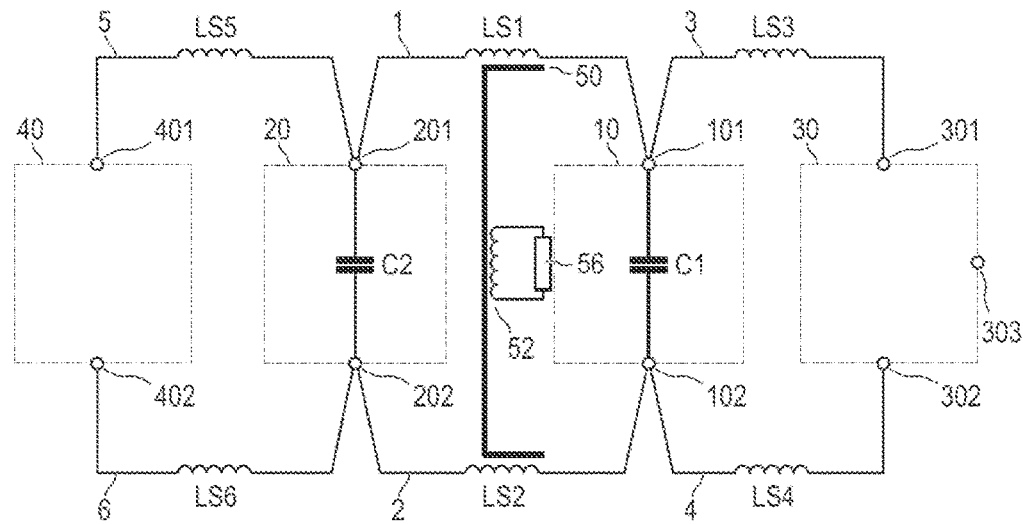
FIG. 3 shows a circuit diagram of a circuit arrangement in accordance with a third example.

As is furthermore illustrated in FIG. 3, in the case of an arrangement explained with reference to FIG. 2, in which arrangement a winding 52 of the magnetic core 50 is embodied as part of a closed current loop, an electrical (ohmic) resistance component 56 (or else a series circuit comprising two or more electrical resistance components 56) can also be part of said closed current loop. A large part of the energy stored in the magnetic field generated by the current through the first connection 1 and/or the second connection 2 can likewise be consumed in the total electrical (ohmic) resistance of the closed current loop. As an alternative or in addition to a resistance component 56, by way of example, the winding 52 can be formed from a resistance wire. The material of such a resistance wire can have e.g. a conductivity of less than 5E+6 siemens/m. In this context, "total electrical (ohmic) resistance of a closed current loop" is understood to mean the electrical (ohmic) resistance which, if the current loop is interrupted at a location, is present between the ends resulting from the interruption.

Insofar as a winding 52 is present, said winding together with the first connection 1 and/or the second connection 2 and the magnetic core 50 forms a transformer, specifically also in the configurations in which the first connection 1 and/or the second connection 2 form(s) no winding(s) of the magnetic core 50. If no winding 52 is present, the first connection 1 and/or the second connection 2 together with the magnetic core 50 forms an increased inductance compared with the pure inductance of the first and/or second connection 1, 2.

In principle, it is advantageous if the first connection 1 and/or the second connection 2 have/has a low electrical (ohmic) resistance and a low leakage inductance LS1 and/or LS2. In this context, it is pointed out that the leakage inductance LS1 denotes only the inductance of the first connection 1 as such, and that the leakage inductance LS2 denotes only the inductance of the second connection 2 as such, i.e. this does not include the increase in inductance in particular as a result of the magnetic core 50 and the possible winding 52. A low electrical (ohmic) resistance of the first connection 1 can be achieved primarily if the first connection 1 and the second connection 2 are made short and wide and are not curved or are at most slightly curved. By way of example, the first connection 1 and/or the second connection 2 can have in each case no complete turn surrounding the magnetic core 50.

Figure 4:
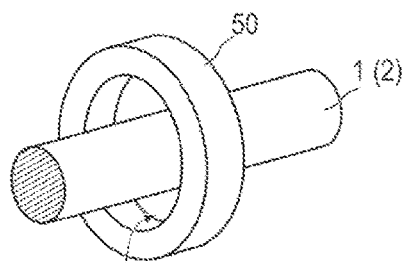
FIG. 4 shows a perspective view of a magnetic core having a through opening through which a first connection is led.

In order to achieve a good electromagnetic coupling between the first connection 1 and/or the second connection 2 and the magnetic core 50, the magnetic core 50 can have a (at least one) feed-through 53 through which (at least) the first connection 1 and/or the second connection 2 are/is led. One example thereof is shown in FIG. 4. The magnetic core 50 in its entirety or a section of the magnetic core 50 is embodied as a closed and—merely by way of example cylindrical—ring. In this respect, the example in accordance with FIG. 4 corresponds to the circuit diagram in accordance with FIG. 1.

Figure 5:
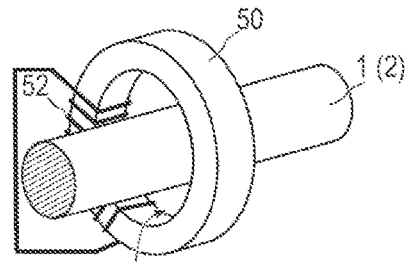
FIG. 5 shows the arrangement in accordance with FIG. 4, wherein the magnetic core is additionally provided with a winding that is a part of a closed current loop.

As is furthermore shown in FIG. 5, a magnetic core 50 can optionally be provided with a winding 52 that forms a part of a closed current loop. In this respect, the example in accordance with FIG. 5 corresponds to the circuit diagram in accordance with FIG. 2.

Figure 6:
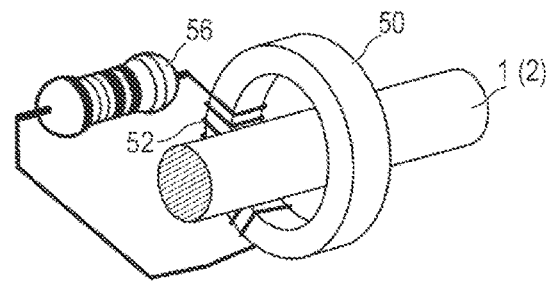
FIG. 6 shows an arrangement corresponding to FIG. 5, wherein a resistance component is part of the closed current loop.

In accordance with a modification illustrated by way of example in FIG. 6, a resistance component 56 can also be part of the closed current loop. In this respect, the example in accordance with FIG. 5 corresponds to the circuit diagram in accordance with FIG. 3.

If a magnetic core 50 is provided with a winding 52, the latter can have a number of turns (for example at least 5 or even at least 10), each of which runs around the magnetic core 50.

Figure 7:
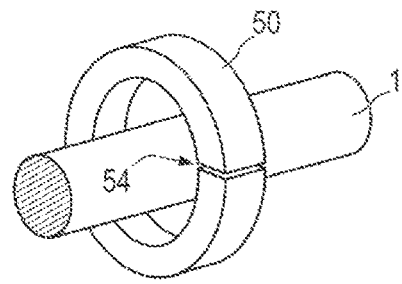
FIG. 7 shows an arrangement that differs from the arrangement in accordance with FIG. 4 in that the magnetic core has a gap.
Figure 8:
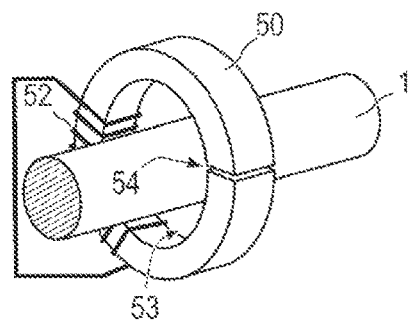
FIG. 8 shows an arrangement that differs from the arrangement in accordance with FIG. 5 in that the magnetic core has a gap.
Figure 9:
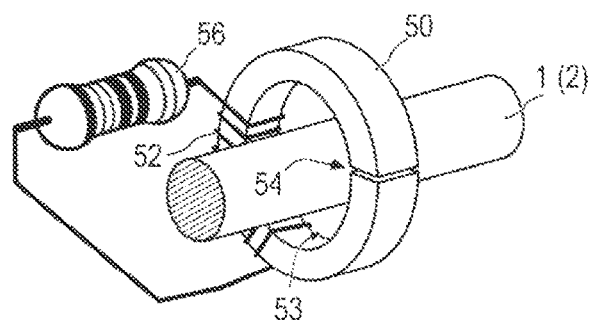
FIG. 9 shows an arrangement that differs from the arrangement in accordance with FIG. 6 in that the magnetic core has a gap.
Figure 10:
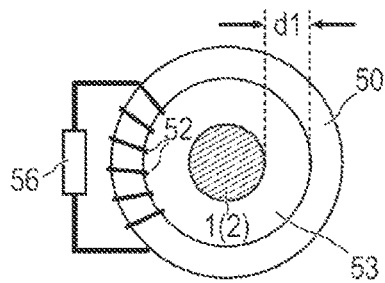
FIG. 10 shows a cross section through the arrangement in accordance with FIG. 6.
Figure 11:
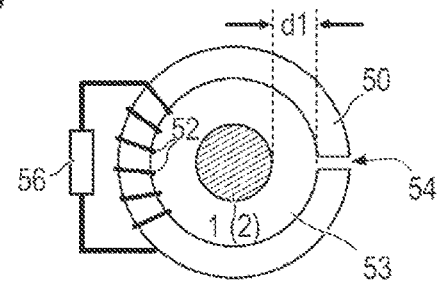
FIG. 11 shows a cross section through the arrangement in accordance with FIG. 9.

Moreover, the magnetic core 50 can have a gap 54, which is shown with reference to FIGS. 7, 8 and 9 for the otherwise identical arrangements from FIGS. 4, 5 and 6, respectively. The gap 54 is free of ferromagnetic material, but it can be filled for example with air or a non-ferromagnetic solid. As a result, the saturation behavior of the magnetic core 50 can be improved, i.e. the magnetic saturation of the magnetic core 50 occurs only at a higher external magnetic field than in the case of an otherwise identical magnetic core 50 without a gap. FIGS. 10 and 11 additionally show cross-sectional views of the arrangements in accordance with FIGS. 6 and 9, respectively.

Figure 12:
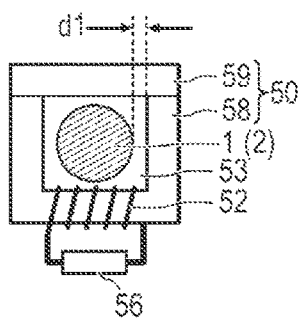
FIG. 12 shows a cross section through an arrangement that differs from the arrangement in accordance with FIG. 10 in that the magnetic core has a U-shaped section.
Figure 13:
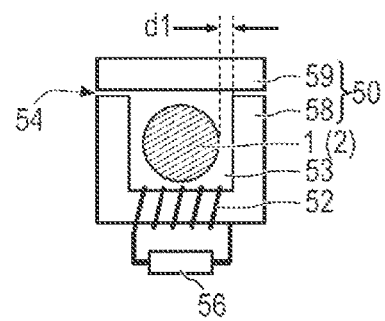
FIG. 13 shows a cross section through an arrangement that differs from the arrangement in accordance with FIG. 11 in that the magnetic core has a U-shaped section.

As is furthermore shown with reference to FIGS. 12 and 13, a magnetic core 50 can also be composed of two or more partial magnetic cores 58, 59. The composite magnetic core 50 illustrated in FIG. 12 has no gap, while the composite magnetic core 50 in accordance with FIG. 13 has a gap. A partial magnetic core 58 can be embodied as a U-core, for example. However, other shapes are likewise possible.

Figure 14:
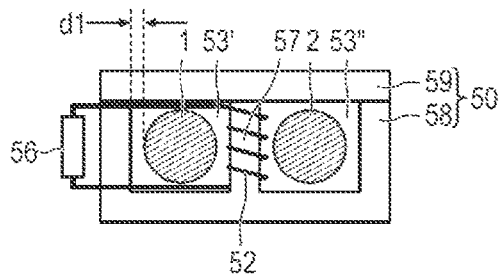
FIG. 14 shows a cross section through an arrangement in which the magnetic core has an E-shaped section having two feed-throughs, and in which the first connection and the second connection are led through different feed-throughs of said two feed-throughs.
Figure 15:
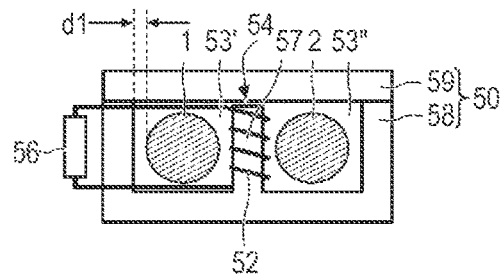
FIG. 15 shows a cross section through an arrangement that differs from the arrangement in accordance with FIG. 14 in that the magnetic core has a gap.

The first and second connections 1, 2 can also be led through a common magnetic core 50, as is illustrated in FIGS. 14 and 15. For this purpose, the first and second connections 1, 2 can be led through the same opening (53) of the magnetic core 50 or, as shown in FIG. 14, through different openings 53', 53" of the magnetic core 50, which are separated from one another by a web 57 of the magnetic core 50. If such a web 57 is present, the winding 52 can also be wound around said web 57. Alternatively, the winding 52 could also be wound around a section of the magnetic core 50 which does not constitute a web 57. The arrangement in accordance with FIG. 15 differs from the arrangement in accordance with FIG. 14 in that the magnetic core 50 has a gap 54.

Figure 16:
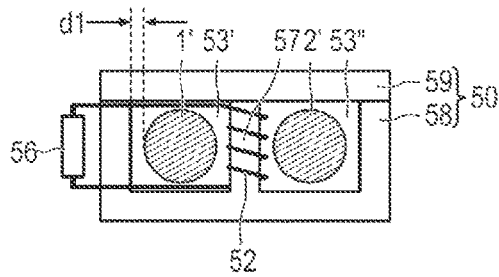
FIG. 16 shows a cross section through an arrangement in which the magnetic core has an E-shaped section having two feed-throughs, and in which a partial connection of the first connection and a partial connection of the second connection are led through different feed-throughs of said two feed-throughs.
Figure 17:
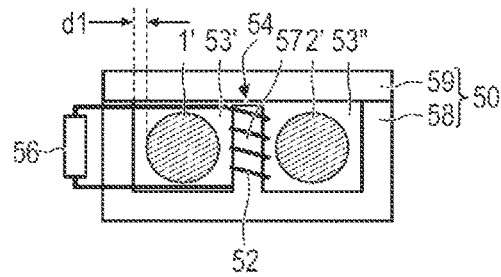
FIG. 17 shows a cross section through an arrangement that differs from the arrangement in accordance with FIG. 16 in that the magnetic core has a gap.
Figure 18:
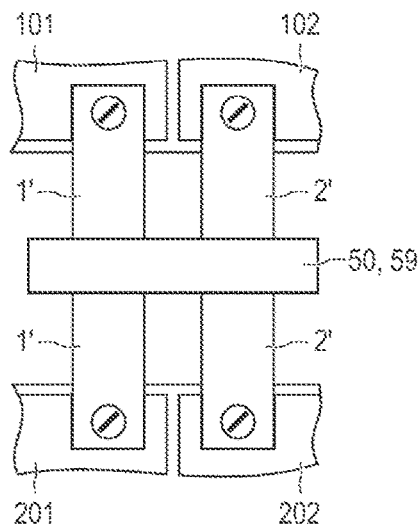
FIG. 18 shows a plan view of the two partial connections of the arrangements in accordance with FIGS. 16 and 17.
Figure 19:
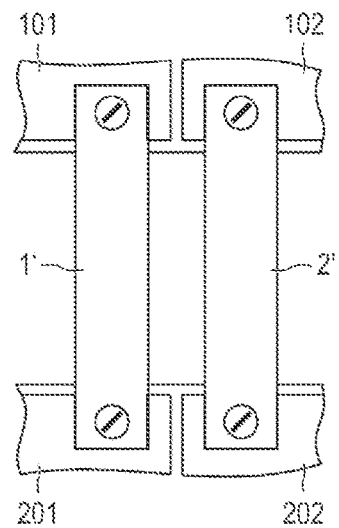
FIG. 19 shows the view in accordance with FIG. 16 with the magnetic core removed.

As is shown in cross section with reference to FIGS. 16 and 17, in plan view in FIG. 18 and in plan view in FIG. 19, but with the magnetic core 50 removed, the circuit arrangement for achieving a particularly low electrical (ohmic) resistance of the first and second connections 1, 2 can be embodied such that the first connection 1 has two or more first partial connections 1' electrically connected in parallel, and that the second connection 2 has two or more second partial connections 2' electrically connected in parallel. In each case one of the partial connections 1' and one of the partial connections 2' can be led through a common magnetic core 50. The relevant two partial connections 1', 2' can in this case be led through the same opening (53) of the magnetic core 50 or, as shown in FIG. 14, through different openings 53', 53" of the magnetic core 50, which are separated from one another by a web 57 of the magnetic core 50. If such a web 57 is present, the winding 52 can also be wound around said web 57. The arrangement in accordance with FIGS. 17 and 19 differs from the arrangement in accordance with FIGS. 16 and 18 in that the magnetic core 50 has a gap 54.

The leading of the first and second connections 1, 2 through a common magnetic core 50 or the leading of a partial connection 1' of the first connection 1 and of a partial connection 2' of the second connection 2 through a common magnetic core 50 is preferably effected such that the currents in the two or partial connections 1 and 2 or 1' and 2', respectively, that are led through the common magnetic core 50 are in opposite directions to one another, such that the magnetic field in the magnetic core 50 and the coupling to the winding 56 are maximized.

In the case of the embodiments in accordance with FIGS. 14 to 19, the magnetic core 50, merely by way of example, has two partial magnetic cores 58, 59. As is likewise shown, in this case one (58) of the partial magnetic cores 58, 59 can be embodied as an E-core. However, other shapes are likewise possible.

A partial magnetic core 58 embodied as an E-core has three parallel sections, wherein the middle section thereof forms the web 57. Analogously thereto, a partial magnetic core 58 can also have four or more parallel sections and correspondingly more webs 57, each of which separates two adjacent through openings of the magnetic core 50 from one another. A partial magnetic core 58 having three or more parallel sections, each of which has a free end, can accordingly have a comb-like structure. On account of the comb-like structure, such a partial magnetic core 58 can be placed onto the finished installed two or more first and second (partial) connections 1, 2, 1', 2'. Optionally, yet another partial magnetic core 59 can be added thereafter.

As can additionally be gathered from FIGS. 18 and 19, a first connection 1, in the case of two or more partial connections 1' of the first connection 1 also each of the partial connections 1', can be electrically connected to the first terminal 101 of the first capacitor unit 10 and/or to the first terminal 201 of the charge storage unit 20 by means of a releasable connection (screw connections are shown merely by way of example). Alternatively or additionally, a second connection 2, in the case of two or more partial connections 2' of the second connection 2 also each of the partial connections 2', can be electrically connected to the second terminal 102 of the first capacitor unit 10 and/or to the second terminal 202 of the charge storage unit 20 by means of a releasable connection (screw connections are shown merely by way of example).

As is additionally illustrated in FIGS. 10 to 17, a good electromagnetic coupling between the first connection 1 and the magnetic core 50 can be achieved by the distance d1 between the magnetic core 50 and the first connection 1 or a partial connection 1' being chosen to be small. By way of example, the distance d1 can be less than 5 mm. Analogously thereto, alternatively or additionally, a good electromagnetic coupling between the second connection 2 and the magnetic core 50 can be achieved by the distance between the magnetic core 50 and the second connection 2 or a partial connection 2' being chosen to be small, for example less than 5 mm.

Figure 20:
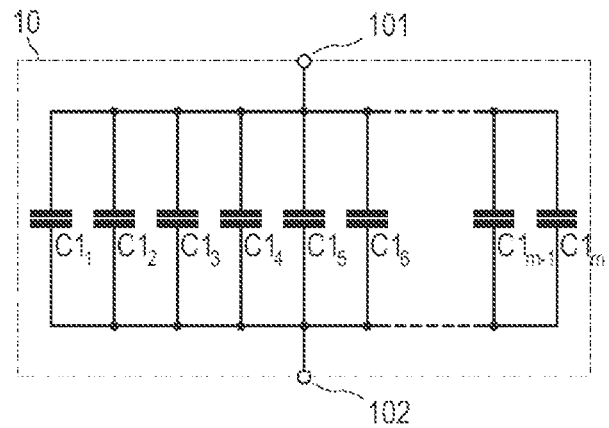
FIG. 20 shows a circuit diagram of a first charge storage unit embodied as a capacitor unit and having a plurality of capacitors electrically connected in parallel with one another.

As is furthermore shown in FIG. 20, a first capacitor arrangement 10 can have not just exactly one capacitor, but also two or more capacitors $C1_1$ to $C1_m$ electrically connected in parallel with one another. Each of said capacitors $C1_1$ to $C1_m$ has a first terminal, by which it is electrically connected to the first terminal 101 of the first capacitor arrangement 10, and also a second terminal, by which it is electrically connected to the second terminal 102 of the first capacitor arrangement 10.

Figure 21:
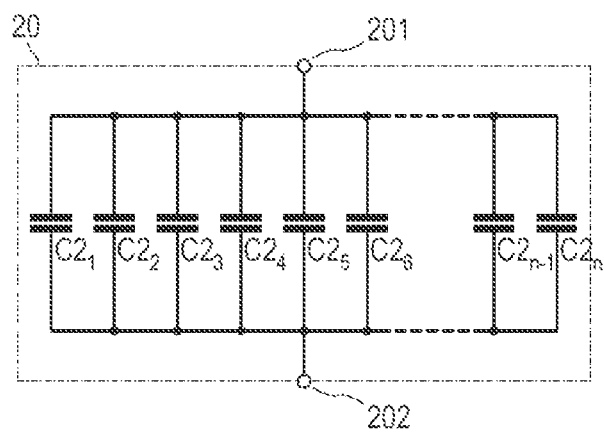
FIG. 21 shows a circuit diagram of a second charge storage unit having a plurality of capacitors electrically connected in parallel with one another.

As is furthermore shown in FIG. 21, a charge storage unit 20 embodied as a (second) capacitor arrangement can have not just exactly one capacitor, but also two or more capacitors $C2_1$ to $C2_n$ electrically connected in parallel with one another. Each of said capacitors $C2_1$ to $C2_n$ has a first terminal, by which it is electrically connected to the first terminal 201 of the second capacitor arrangement 20, and also a second terminal, by which it is electrically connected to the second terminal 202 of the second capacitor arrangement 20.

Figure 22:
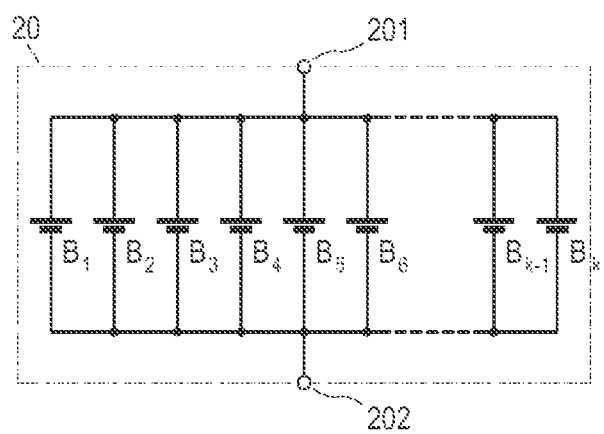
FIG. 22 shows a circuit diagram of a second charge storage unit having a plurality of rechargeable batteries electrically connected in parallel with one another.

As is additionally illustrated in FIG. 22, a charge storage unit 20 based on rechargeable batteries can have not just exactly one rechargeable battery, but also two or more rechargeable batteries $B_1$ to $B_k$ electrically connected in parallel with one another. Each of said rechargeable batteries $B_1$ to $B_k$ has a first terminal (anode or cathode), by which it is electrically connected to the first terminal 201 of the second capacitor arrangement 20, and also a second terminal (cathode or anode), which is complementary to the first terminal and by which said rechargeable battery is electrically connected to the second terminal 202 of the second capacitor arrangement 20. In this case, all the anodes are electrically connected to one another and all the cathodes are electrically connected to one another. A charge storage unit 40 can in particular also be a rechargeable battery of a motor vehicle (colloquially also "vehicle battery") having a plurality of rechargeable battery cells electrically connected in parallel, which in this case correspond to the rechargeable batteries $B_1$ to $B_k$ k explained.

Three exemplary embodiments of possible configurations of a power semiconductor circuit 30 are explained below with reference to FIGS. 23 to 25.

Figure 23:
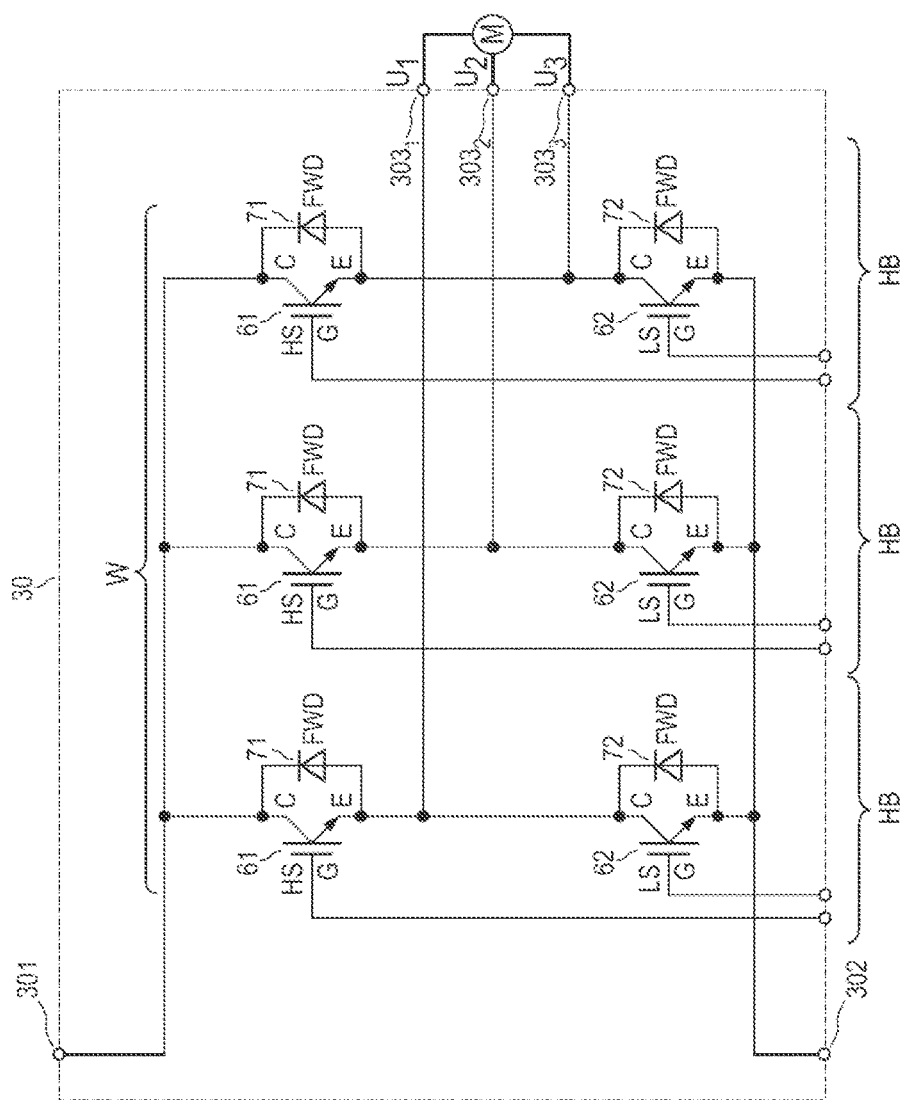
FIG. 23 shows a circuit diagram of a power semiconductor circuit having one half-bridge.

FIG. 23 shows a circuit diagram of a power semiconductor circuit 30 embodied as a power part of a three-phase inverter. The inverter circuit W has a half-bridge branch HB for each of the three phases. The half-bridges HB in each case have two controllable semiconductor switches 61 (HS="High Side") and 62 (LS="Low Side"), the load paths (C-E) of which are controllable in each case via a control terminal G ("Gate"). A gate series resistor RG can in each case be connected upstream of the control terminals G. Optionally, a freewheeling diode FWD can in each case be connected in (anti)parallel with the load paths (C-E) of each of the semiconductor switches 61, 62. Even though n-channel IGBTs are shown as semiconductor switches 61, 62 in the present example, it is possible to use arbitrary other bipolar or unipolar semiconductor switches 61, 62 instead, for example MOSFETs (Metal Oxide Semiconductor Field Effect Transistor), JFETs (Junction Field Effect Transistor), HEMTs (High Electron Mobility Transistor), thyristors, etc.

By means of suitable driving of the controllable semiconductor switches LS, HS of the half-bridges HB, a desired voltage profile can be set for each half-bridge HB at a circuit node between the load paths (C-E) of the two semiconductor switches LS and HS of said half-bridge HB. The output voltages of the half-bridges HB are designated by U1, U2 and U3, respectively. These output voltages U1, U2 and U3, respectively, are substantially identical to the voltages occurring at the circuit nodes of the half-bridges HB.

Figure 25:
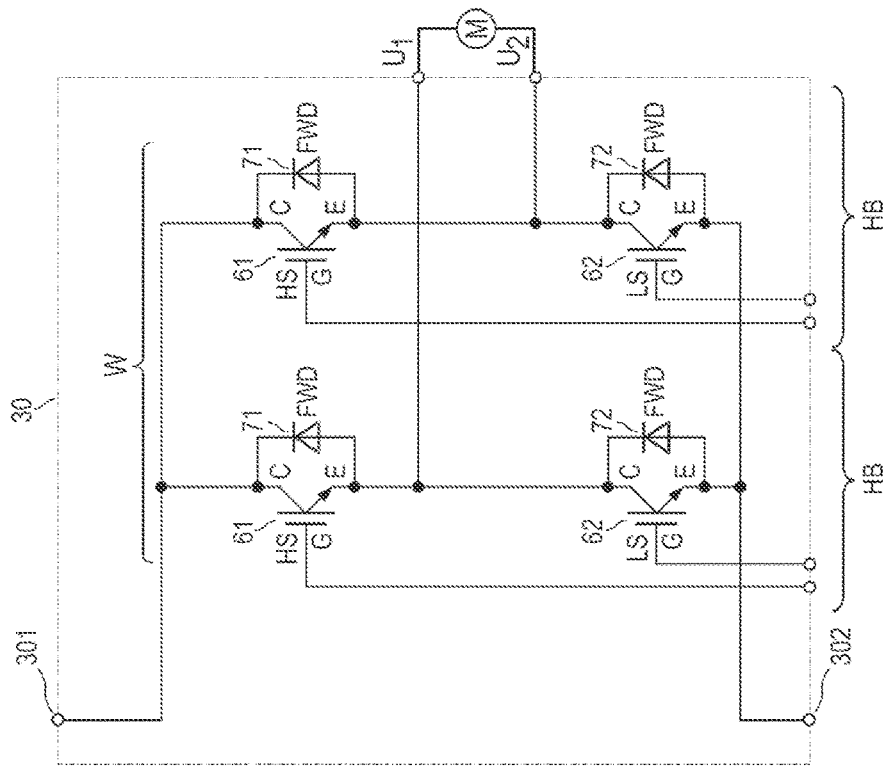
FIG. 25 shows a circuit diagram of a power semiconductor circuit having three half-bridges.
Figure 24:
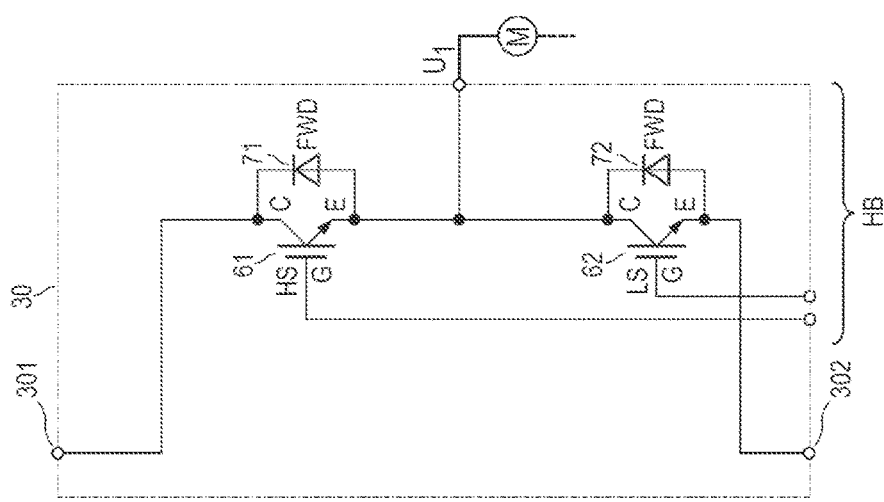
FIG. 24 shows a circuit diagram of a power semiconductor circuit having two half-bridges.

As is furthermore shown in FIGS. 24 and 25, a power semiconductor component 30 can also comprise only a part of such an inverter. For example, a power semiconductor component 30 can comprise only one half-bridge HB having an output U1 (FIG. 24), or two half-bridges HB (FIG. 25) having a respective output U1 and U2.

Independently of the specific configuration of a power semiconductor circuit 30, the latter can have one or a plurality of outputs U1, U2, U3, each of which can be connected to an electrical load, in particular also but not only an inductive load M (e.g. an electric motor).

Figure 26:
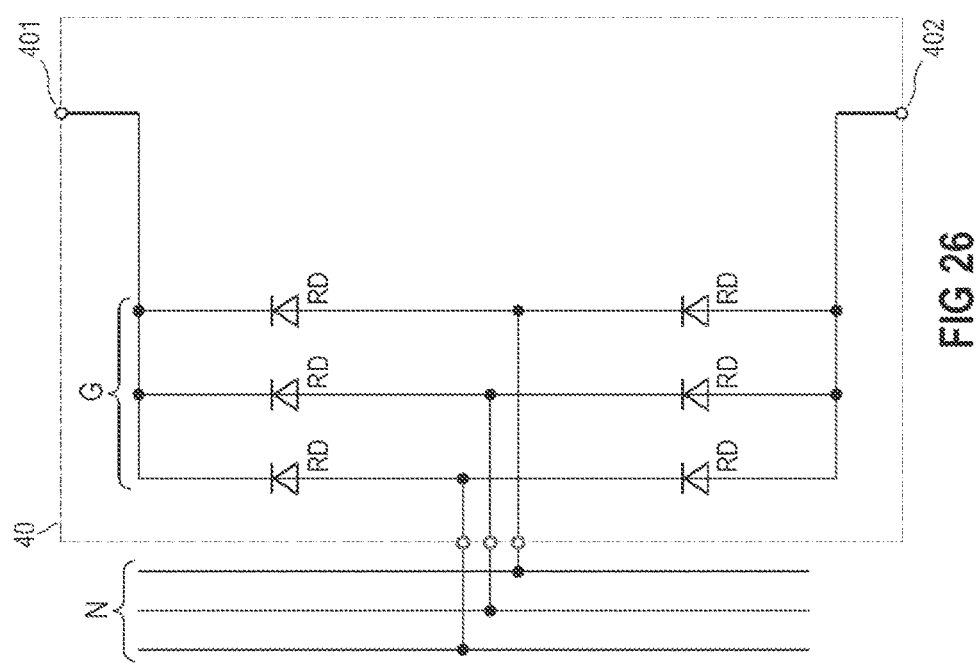
FIG. 26 shows a circuit diagram of a power semiconductor circuit embodied as a rectifier circuit.

In accordance with a further example shown in FIG. 26, an optional power semiconductor circuit 40 can be embodied as a rectifier circuit G. The rectifier circuit G has, merely by way of example, rectifier diodes RD, but it could e.g. also contain thyristors or turn-off power semiconductors and PFC circuits (PFC=power factor correcting). From an AC voltage from a power supply system N having three phases, for example, the rectifier circuit G generates a rectified voltage that is provided between the terminals 401 and 402. This voltage can be used for charging the charge storage unit 20.

Figure 27:
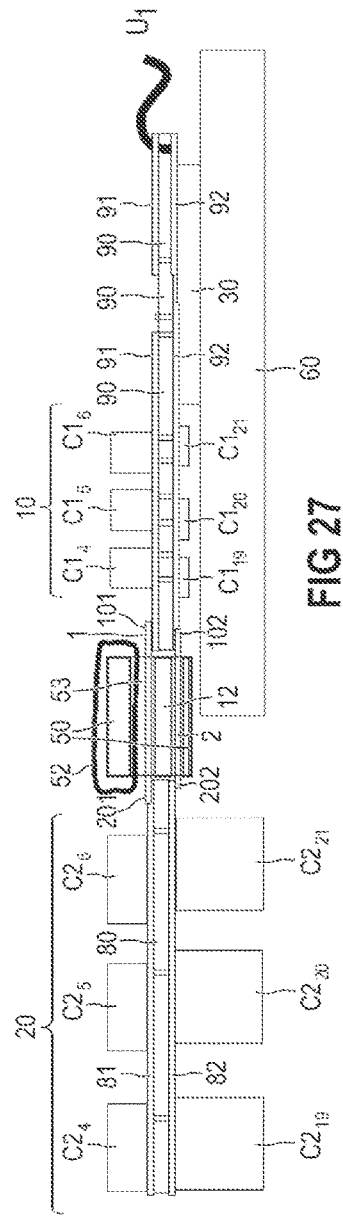
FIG. 27 shows a cross section through a circuit arrangement comprising a power semiconductor circuit, a first charge storage unit and a second charge storage unit.
Figure 28:
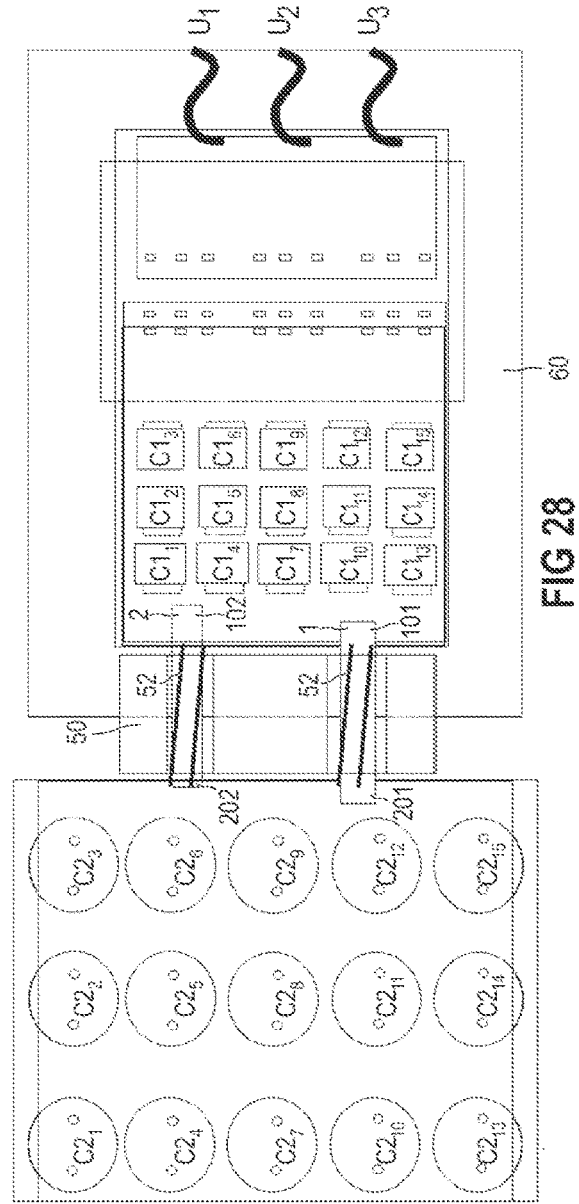
FIG. 28 shows a plan view of the circuit arrangement in accordance with FIG. 27.

FIGS. 27 and 28 show a circuit arrangement comprising a power semiconductor circuit 30, a first capacitor arrangement 10 and a charge storage unit 20 in cross section and in plan view, respectively.

A first printed circuit board has a first metallization layer 91 and a second metallization layer 92 parallel to the latter. An electrically insulating layer 90 is situated between the metallization layers 91, 92. The first printed circuit board is populated with a power semiconductor module containing a power semiconductor circuit 30 (e.g. one of the power semiconductor circuits 30 explained with reference to FIGS. 23 to 25). On the top side and the underside of the first printed circuit board there are arranged in each case a plurality of capacitors $C1_x$ which are electrically connected in parallel with the aid of the metallization layers 91 and 92 to form a capacitor arrangement 10. As a result of the common mounting of the capacitor arrangement 10 and the power semiconductor module on the same first printed circuit board 90, 91, 92, it is possible to realize the third and fourth connections 3 and 4, respectively, with the aid of the metallization layers 91, 92 and to keep their leakage inductances LS3 and LS4, respectively, low.

A second printed circuit board likewise has a first metallization layer 81 and a second metallization layer 82 parallel to the latter. An electrically insulating layer 80 is situated between the metallization layers 81, 82. On the top side and the underside of the second printed circuit board there are arranged in each case a plurality of capacitors $C2_y$, which are electrically connected in parallel with the aid of the metallization layers 81 and 82 to form a second charge storage unit 20 embodied as a (second) capacitor arrangement. Instead of the capacitors $C2_y$, rechargeable batteries $B_z$ could also be connected in parallel in this way.

The metallization layer 81 contains a (at least one) first terminal 201 and the metallization layer 82 contains a (at least one) second terminal 202.

Moreover, the metallization layer 91 contains a (at least one) first terminal 101 and the metallization layer 92 contains a (at least one) second terminal 102. The metallization layer 81 is electrically connected to the metallization layer 91 by a first connection 1, and the metallization layer 82 is electrically connected to the metallization layer 92 by a second connection 2. For this purpose, the first connection 1 can be electrically connected both to the metallization layer 81 and to the metallization layer 91 by means of a releasable connection, and the second connection 2 can be electrically connected both to the metallization layer 82 and to the metallization layer 92 by means of a releasable connection. Instead of releasable connections (e.g. screw, plug or clamping connections), however, it is also possible to use non-releasable, cohesive connections (e.g. soldering, welding, electrically conductive adhesive connections or also sintered connections).

In the present invention, at least the magnetic core 50, optionally also the magnetic core 50 together with the (secondary) winding 52 constituting a part of a closed current loop, constitutes a dynamically acting resistance which, only in the event of a change in the current flowing through the first and/or second connection 1, 2, takes up the energy stored in the remaining field of the associated leakage inductance LS1 and/or LS2 which was brought about by the current flowing through the first and/or second connection 1, 2. Oscillations between the first capacitor arrangement 10 and the charge storage unit 20 are thereby damped. At the same time, the dynamically acting electrical (ohmic) resistance can be chosen to be greater than the internal resistance (ESR=Electrical Serial Resistance) of the total resistance of the capacitors C1 and C2 and of the first and second connections 1 and 2, or greater than the total resistance of the capacitors C1 and of the rechargeable batteries B and of the first and second connections 1, 2. Thus, the energy stored in the residual leakage inductance LS1, LS2 can be converted for the most part in the dynamically acting resistance and the total losses in capacitors and lines can be kept small.

The circuit comprising the first capacitor arrangement 10 and the leakage inductances LS3 and LS4 can be kept very small for example by virtue of the third and fourth connections 3, 4 being embodied as mutually parallel, closely adjacent and planar metallizations (e.g. of a printed circuit board) or metal plates. By way of example, the product of the sum of the leakage inductances LS3+LS4 of the third and fourth connections 3, 4 and the maximum current through the third connection 3 that occurs during operation can be less than 10 µVs or even less than 5 µVs.

The wiring within the charge storage unit 20 for the electrical connection of the capacitors $C2_1$ to $C2_n$ or of the rechargeable batteries $B_1$ to $B_k$ can also be embodied with the aid of mutually parallel, thin and planar metallizations or printed circuit boards, one of which is connected to the first terminal 201 of the charge storage unit 20 and the other of which is connected to the second terminal 202 of said charge storage unit. The charge storage unit 20 as such can thus be embodied with very low inductance. The leakage inductance of such parallel, closely adjacent and planar metallizations (e.g. of a printed circuit board) or metal plates can be chosen to be very small. By way of example, the product of their leakage inductance (without the leakage inductance of the capacitors $C2_1$ to $C2_n$ or rechargeable batteries $B_1$ to $B_k$) and the nominal current $I_{nom}$ of the power semiconductor circuit 30 can be less than 10 µVs or even less than 5 µVs.

The geometry of the connections 1, 2 in accordance with FIGS. 27 and 28 between the printed circuit boards 80, 81, 82 and 90, 91, 92—webs 1, 2 lying alongside one another— bring about a leakage inductance that is significantly higher than that within the striplines (81/82 and 91/92) that connect the capacitors $C2_i$ or $C1_i$ among one another and connect the first capacitor arrangement C1 to the circuit arrangement 30. The leakage inductances LS1, LS2 are thus substantially localized at these connections. By way of example, the ratio (LS3+LS4)/(LS1+LS2) between the total leakage inductance LS3+LS4 of the third and fourth connections 3, 4 and the total leakage inductance LS1+LS2 of the first and second connections 1, 2 can be at least 2.5 or even at least 5.0.

Adding a core 50 having a (secondary) winding 52 results in a transformer. The original leakage inductance LS1+LS2 of the first and/or second connections 1, 2 is thereby reduced because a magnetic field generated by the first and/or second connection 1, 2 is partly compensated for on account of the secondary current through the secondary winding 52. On account of the simple geometry of the transformer, the coupling between the first and/or second connections 1, 2 and the winding 52 is not optimal, with the result that a residual leakage inductance remains. By just adding a magnetic core 50 comprising lossy material of the magnetic core 50, although a damping and a shifting of the additional heat are likewise achieved, the leakage inductance of the first and/or second connection 1, 2 is also increased. Therefore, the arrangement comprising a secondary winding (i.e. the transformer solution) is preferred over the solution comprising a magnetic core 50 without a winding 52. The residual leakage inductance that remained, a fraction of LS1+LS2, still leads to storage of magnetic energy that is converted in the resistances following respective switching processes. Depending on the magnitude of the dynamic resistance that additionally acts on account of the magnetic core 50 and the winding 52 (if appropriate together with electrical resistance component 56), undesired current oscillations can still occur as a result of the first and second connections 1, 2, or the aperiodic limiting case can occur, or the creepage case (that is to say that the damping can be set, for example, such that the damping is at least of the same magnitude as in the aperiodic limiting case).

In order to dissipate the heat arising in a magnetic core 50 and/or a winding 52 and/or a resistance component 56, one, a plurality or all of these elements can be cooled, for example with the aid of a heat sink, a fan, a liquid cooling system or another cooling device.

Between the conductor tracks 91 and 92, the power semiconductor circuit 30 as such has a low (inherent) inductance, for example approximately 5 nH. The maximum current through the first connection 1 that occurs during operation can be e.g. 800 A, for example at least 200 A. The leakage inductance of the second printed circuit board with the metallization layers 91 and 92 and the capacitors $C1_x$ situated thereon is approximately 2.5 nH. In total (LS3+LS4), this results in an inductance of 7.5 nH (=inductance of the power semiconductor module+inductance of the capacitors $C1_x$+leakage inductances of the metallization layers 91 and 92).

The capacitors $C1_x$ on the underside of the second printed circuit board (i.e. the capacitors $C1_x$ which, like the capacitors $C1_{19}$, $C1_{20}$, and $C1_{21}$ illustrated in FIG. 27, are situated on the same side of the second printed circuit board as the power semiconductor module) each have a capacitance of e.g. 1 μF, and the capacitors $C1_1$ to $C1_{15}$ arranged on the top side of the second printed circuit board each have a capacitance of e.g. 5 μF. Of those capacitors $C1_x$ which are arranged on the underside of the second printed circuit board, one, a plurality or all can optionally be arranged between the second printed circuit board and a heat sink 60 on which the power semiconductor module is mounted for cooling purposes. Overall, a value of approximately 23 μF results for the capacitance C1 of all the capacitors $C1_x$ connected in parallel. This value suffices to keep overvoltages that occur sufficiently low.

The capacitance C2 of the capacitors $C2_y$ connected in parallel by means of the first printed circuit board is approximately 1 mF. The inductance of the second capacitor arrangement 20 is approximately 5 nH.

The first connection 1 and the second connection 2 between the first printed circuit board (80, 81, 82) and the second printed circuit board (90, 91, 92) are realized by two or more conductor webs 1'+2' situated alongside one another. Overall, all the conductor webs 1'+2' together have a leakage inductance (=LS1+LS2) of approximately 50 nH. The magnetic core 50 is arranged around said conductor webs 1'+2', as explained.

The winding 52 has a small number of turns (e.g. 10). The winding 52 is part of a closed conductor loop whose electrical (ohmic) resistance is approximately 9.5 Ω. This results in an (only dynamic effective) additional electrical (ohmic) resistance of approximately 95 mΩ in the first connection 1.

Features and/or value limits that are expedient for circuit arrangements in the high-power range are additionally mentioned below. The features and value limits mentioned apply not just to the construction explained with reference to FIGS. 27 and 28, but generally:

The distance d1 between the first connection 1 and the magnetic core 50 is less than 5 mm.

The total capacitance C1 of the first capacitor arrangement 10 can be less than 25 μF, and/or can be at least 2 μF.

The total capacitance C2 of a charge storage unit 20 embodied as a (second) capacitor arrangement can be greater than 1 mF.

The total capacity of a charge storage unit 20 embodied as a rechargeable battery can be greater than 100 Ah.

The magnetic core 50 can have a relative magnetic permeability of at least 500 at a temperature of 105° C.

A winding 52 can have at least 2, at least 5 or at least 10 turns that are wound around the magnetic core 50.

The winding 52 is part of a closed conductor loop whose electrical (ohmic) resistance is at least 0.3 Ω.

The total leakage inductance LS1+LS2 of the first and second connections 1, 2 as such can be less than 100 nH.

The total leakage inductance LS1+LS2 of the first and second connections 1, 2 including a magnetic core 50 and—if present—including all windings 52 of the magnetic core 50 and—if present—all resistance components 56 can be at least 20 nH, and/or at least 2.5 times or 5.0 times the total leakage inductance LS3+LS4 of the third and fourth connections 3, 4 as such.

For the total electrical (ohmic) resistance R of a closed current loop containing a (secondary) winding 52 (optionally also one or a plurality of resistance components 56), the following can hold true:

$$R \approx 2 \cdot N2 \cdot \sqrt{\frac{LS1 + LS2}{C1}} \text{; or} \quad (a)$$

$$N2 \cdot \sqrt{\frac{LS1 + LS2}{C1}} < R < 2 \cdot N2 \cdot \sqrt{\frac{LS1 + LS2}{C1}} \text{; or} \quad (b)$$

$$R > 2 \cdot N2 \cdot \sqrt{\frac{LS1 + LS2}{C1}} \quad (c)$$

In this case, N2 is the number of turns of the winding 52. These conditions hold true for the case where in the first and second connections 1, 2 together there is exactly one magnetic core 50 having a winding 52 with resistance 56. If a plurality of magnetic cores 50 and/or a plurality of windings 52 and/or a plurality of resistances 56 are present, the abovementioned conditions (a), (b) or (c) hold true for an effective resistance. Said effective resistance is the resistance that brings about the same damping as the—if present—plurality of magnetic cores 50, plurality of windings 52 and plurality of resistances 56.

The first power semiconductor circuit 30 contains one half-bridge HB or two half-bridges HB or three half-bridges HB or a multi-level circuit or a matrix circuit or a chopper circuit.

The load paths of a first semiconductor component 61, 71 and a second semiconductor component 62, 72 are electrically connected in series between the first and second terminals 301 and 302, respectively, of the power semiconductor circuit 30.

The values and features mentioned can be used individually but also in arbitrary combinations with one another.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A circuit arrangement, comprising:
a power semiconductor circuit having a first terminal and a second terminal, and a first semiconductor component and a second semiconductor component having load paths which are electrically connected in series between the first terminal and the second terminal;
a first charge storage unit having a first terminal and a second terminal; and
a second charge storage unit having a first terminal and a second terminal;
a first connection electrically connecting the first terminal of the first charge storage unit to the first terminal of the second charge storage unit to provide a galvanic path between the first terminal of the first charge storage unit and the first terminal of the second charge storage unit;

a second connection electrically connecting the second terminal of the first charge storage unit to the second terminal of the second charge storage unit to provide a galvanic path between the second terminal of the first charge storage unit and the second terminal of the second charge storage unit; and a magnetic core electromagnetically coupled to the first connection and/or the second connection.

2. The circuit arrangement of claim 1, wherein a distance between the magnetic core and the first connection is less than 5 mm.

3. The circuit arrangement of claim 1, wherein the magnetic core has a feed-through, through which the first connection and/or the second connection is fed through.

4. The circuit arrangement of claim 1, wherein the magnetic core or a section of the magnetic core is a closed ring through which the first connection and/or the second connection is fed through.

5. The circuit arrangement of claim 1, wherein the magnetic core or a continuous section of the magnetic core is a U-shaped core or as an E-shaped core.

6. The circuit arrangement of claim 1, wherein the first connection and/or the second connection has no complete turn surrounding the magnetic core.

7. The circuit arrangement of claim 1, wherein the magnetic core has a relative magnetic permeability of at least 500 at a temperature of 105° C.

8. The circuit arrangement of claim 1, wherein the first charge storage unit comprises one capacitor or a plurality of capacitors electrically connected in parallel with one another.

9. The circuit arrangement of claim 1, wherein the magnetic core has an additional winding different than the first connection and/or the second connection.

10. The circuit arrangement of claim 9, wherein the additional winding has at least two turns, each of which is wound around the magnetic core.

11. The circuit arrangement of claim 9, wherein the additional winding is part of a closed current loop having a total electrical resistance of at least 0.3 Ohm.

12. The circuit arrangement of claim 9, wherein the additional winding is part of a closed current loop having N2 turns and a total electrical resistance R which satisfies one of the following criteria:

$$R \approx 2 \cdot N2 \cdot \sqrt{\frac{LS1 + LS2}{C1}} \quad (a)$$

$$N2 \cdot \sqrt{\frac{LS1 + LS2}{C1}} < R < 2 \cdot N2 \cdot \sqrt{\frac{LS1 + LS2}{C1}} \quad (b)$$

$$R > 2 \cdot N2 \cdot \sqrt{\frac{LS1 + LS2}{C1}} \quad (c)$$

where LS1 is a leakage inductance of the first connection, LS2 is a leakage inductance of the second connection, and C1 is a capacitance of the first charge storage unit.

13. The circuit arrangement of claim 1, wherein the second charge storage unit comprises one capacitor or a plurality of capacitors electrically connected in parallel with one another.

14. The circuit arrangement of claim 13, wherein the second charge storage unit has a capacitance of at least 500 µF.

15. The circuit arrangement of claim 13, wherein a capacitance of the second charge storage unit is at least 10 times a capacitance of the first charge storage unit.

16. The circuit arrangement of claim 1, wherein the second charge storage unit comprises one rechargeable battery or a plurality of rechargeable batteries electrically connected in parallel with one another.

17. The circuit arrangement of claim 1, wherein:
the first connection has a leakage inductance LS1;
the second connection has a leakage inductance LS2; and
a total leakage inductance LS1+LS2 of the first and second connections is greater than 2.5 times the leakage inductance LS2 of the second charge storage unit.

18. The circuit arrangement of claim 1, further comprising:
a third connection electrically connecting the first terminal of the first charge storage unit to the first terminal of the power semiconductor circuit to provide a galvanic path between the first terminal of the first charge storage unit and the first terminal of the power semiconductor circuit; and
a fourth connection electrically connecting the second terminal of the first charge storage unit to the second terminal of the power semiconductor circuit to provide a galvanic path between the second terminal of the first charge storage unit and the second terminal of the power semiconductor circuit.

19. The circuit arrangement of claim 18, wherein:
the first connection has a leakage inductance LS1;
the second connection has a leakage inductance LS2;
the third connection has a leakage inductance LS3;
the fourth connection has a leakage inductance LS4; and
a ratio (LS3+LS4)/(LS1+LS2) between a total leakage inductance LS3+LS4 of the third and fourth connections and a total leakage inductance LS1+LS2 of the first and second connections is at least 2.5.

20. The circuit arrangement of claim 18, wherein:
the first connection has a leakage inductance LS1;
the second connection has a leakage inductance LS2;
the third connection has a leakage inductance LS3;
the fourth connection has a leakage inductance LS4; and
a total leakage inductance LS1+LS2 of the first and second connections is greater than 2.5 times the sum of LS3, LS4 and a leakage inductance of the second charge storage unit.

* * * * *